United States Patent Office 3,033,734
Patented May 8, 1962

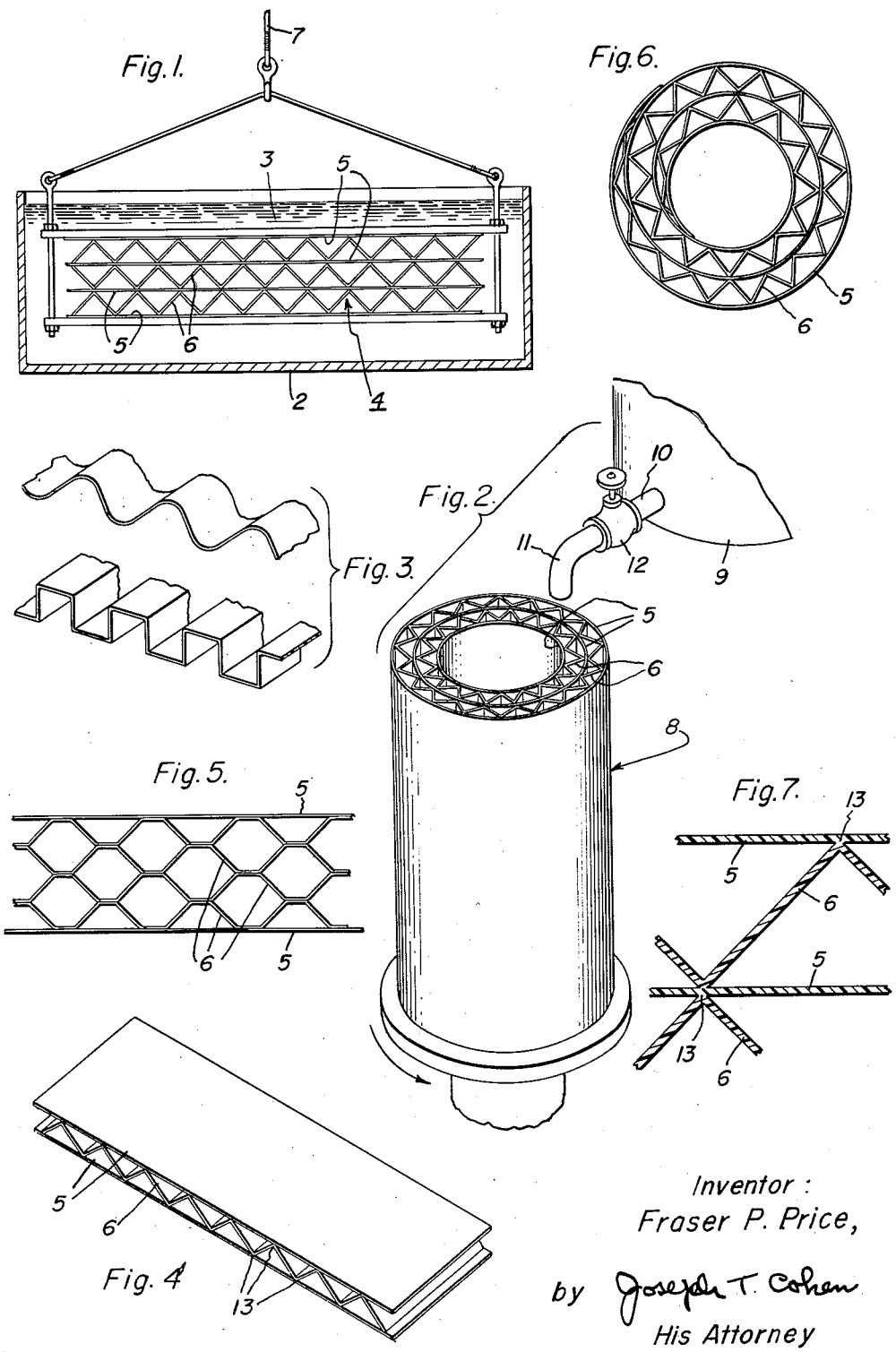

3,033,734
HONEYCOMB STRUCTURES
Fraser P. Price, Schenectady, N.Y., assignor to General
Electric Company, a corporation of New York
Filed Aug. 27, 1959, Ser. No. 836,427
3 Claims. (Cl. 156—305)

This invention relates to honeycomb structures and methods for making them. More particularly the invention is concerned with a means for fabricating honeycomb structures which comprises (1) placing in contact relationship a core material and a sheet facing material at least one of which materials is a thermoplastic surfaced material soluble in a common suitable solvent such as toluene, trichloroethylene, etc., (2) while maintaining this contacting relationship exposing the thermoplastic surface to a solvent therefor for a time sufficient to cause tackiness of the thermoplastic surface whereby the tacky surface adheres to the contacting surface of the assembly, and (3) removing the solvent from contact with the thermoplastic surface and the total assembly.

In the past, honeycomb structures have been prepared employing various methods whereby surface sheets and core material are joined together usually in the form of laminates by the application of an adhesive between the contacting points of the core material and the surface material, or by impregnation of one or both of these core materials or surface materials with a resin and bonding the same by means of heat and pressure. Although these methods may be satisfactory under some conditions, they are nevertheless in many instances quite expensive to operate as a process and require special equipment In addition, the fact that there are other steps involved such as impregnation, heat and pressure application, etc., increases the handling operations and obviously increases the expense of the ultimate product.

Unexpectedly I have discovered that I can make honeycomb structures having good physical strength, and the method for making them is relatively inexpensive compared to prior methods for making such structures and does not require any special equipment for fabrication. In accordance with my invention, I bring a core material of relatively substantially irregular shape in contact with a sheet facing material at least one of said materials being thermoplastic and capable of solution by usual common solvents. This assembly, in contacting relationship of the core material and the facing material, is held substantially rigidly in place and while in this position a solvent for the thermoplastic composition is caused to pass preferably over all points of contact between the thermoplastic surface and the other material (whether the thermoplastic surface is on the core material or on the face sheet material, or on both materials), and thereafter removing the solvent after a period of time sufficient only to cause softening of the thermpolastic surface and formation of a tacky layer thereon, but insufficient to cause undesirable dissolving of the thermoplastic so that there is little, if any, remaining in contact with the other part of the assembly.

It is accordingly an object of this invention to form honeycomb structures inexpensively and from relatively inexpensive materials.

It is another object of this invention to form honeycomb structures without the need of special adhesives.

A still further object of the invention is the preparation of honeycomb structures which do not require heat and pressure in their fabrication nor do they require any special equipment.

It is a final object of this invention to make honeycomb structures employing inexpensive solvents for effecting adhesion of the members of the honeycomb assembly and recovering said solvents by means readily amenable to commercial production.

The honeycomb structure materials made in accordance with my process have many valuable uses. Thus, these honeycomb structures may be used as insulation for cold or heat especially where the heat is not excessive so as to cause undesirable fusion or melting of the thermoplastic portion of the assembly. In addition, these honeycomb structures can be used as sound adsorbers or light diffusers. Because of the unexpected physical strengths of the cored structures made in accordance with my invention, they can be used as partitions in building structures and can be used in the construction of aircraft bodies as well as for fabrication of wings of such aircraft. They can also be used in packaging as protection for fragile or sensitive materials or apparatus.

In the following description and in the claims appended hereto, the term "core material" is intended to cover irregularly shaped sheet material preferably but not essentially capable of remaining irregularly shaped without support. Included in such core materials are, for instance, creped surfaces, corrugated surfaces, or similarly shaped strip or sheet material which in contact with a surface or adjacent sheet material will form hollow structures such as circles, hexagons, squares, rectangles, triangles, trapezoids, etc. These core materials may be made wholly of a thermoplastic composition in either sheet or strip form (of from about 2 mils to 100 mils or more thick) or they may be base materials, for instance, paper or cloth, or even metal, the surface of whose substrate is coated with the thermoplastic composition.

Included among such thermoplastic compositions are polyvinyl chloride, copolymers of vinyl chloride and vinyl acetate, copolymers of vinyl chloride and vinyl propionate, plasticized polyvinyl chloride or plasticized copolymers of vinyl chloride and vinyl acetate, polyvinylidene chloride, polymethyl methacrylate, polystyrene, nylon, ethyl cellulose, cellulose acetate, cellulose acetate butyrate, polyethylene, polyisobutylene, polyformaldehyde resins such as Delrin resins sold by E. I. du Pont de Nemours and Company, Bloomington, Delaware), polycarbonate resins, for instance, those made from the reaction of phosgene and of bis-phenol-A (e.g. Lexan resins manufactured by General Electric Company), etc. Where impregnated core material is employed, i.e. surface material coated and preferably impregnated with the thermoplastic resin (for instance, by the application of a resin film to the substrate, or by dipping the substrate in a solution of the thermoplastic resin and thereafter removing the solvent), it is desirable that the thickness of the thermoplastic resin on the substrate be at least 2 to 3 mils up to 50 or more mils thick in order that in subsequent treatment of the solvent there is sufficient thermoplastic resin to become soft and tacky so as to adhere to the next layer of core material or surface material as the case may be. When employing a paper, kraft base sheet about 5 to 50 mils thick is advantageously coated with from 3 to 25 or more mils of the thermoplastic resin.

The term "surface material" is intended to mean flat stock strip or sheet material which may be either made entirely of a thermoplastic resin or may again be a suitable sheet filler material impregnated and/or coated with the thermoplastic resin. Again this surface material may be paper, cloth, metal, etc. Advantageously, the core and sheet materials are made of as inexpensive materials as possible (consistent with the application involved) because the honeycomb structures of my invention are unexpectedly strong and may be used structurally in many applications without employing expensive fillers for either the core material or the surface material. The term "surface material" as used here is also intended to include not only the outer surfaces of the total assembly containing the core material with its irregular surface sandwiched between outer surface materials, but is also intended to include alternate layers of the core material and the surface material in a sandwich-type structure. The rules for thickness of base material and surface coating of the thermoplastic resin as well as of the entire thickness of the surface material are essentially the same as those recited for the core material. It may be desirable to use thicker or thinner thicknesses of the surface material than is used in making the core material depending on the application involved.

The features and advantages of my invention will be apparent from the following description taken in connection with the accompanying drawings in which:

FIG. 1 illustrates a stacked laminated honeycomb structure being immersed in a tank containing a solvent, the said structure being composed of a series of layers of core material interspersed with a series of layers of surface materials.

FIG. 2 illustrates a roll laminate which rather than being immersed in a solvent for the thermoplastic is being filled with a solvent, i.e., a solvent is allowed to course over the internal openings of the core structure.

FIG. 3 shows two other types of configurations of which the core structures may be made.

FIG. 4 is a perspective view of a corrugated core laminate constructed in accordance with my invention.

FIG. 5 illustrates a stacked laminated honeycomb structure composed of a series of layers of core materials (hexagonal in shape) sandwiched between two surface materials.

FIG. 6 shows a plan view of a spiral arrangement of core and surface materials.

FIG. 7 is a sectional view of the joint or weld obtained between the core material and surface material at the points of contact.

In FIG. 1 is shown a tank 2 containing a solvent 3 and a stacked laminated structure 4 comprising facing sheets 5 and crimped or corrugated core sheets 6. The facing sheets and corrugated or crimped plastic core sheets are alternately stacked in the form of a laminated structure. Any number of core sheets or facing sheets may be employed depending on the end use of the product.

The stacked structure as illustrated in FIG. 1 may be clamped or tied together with any suitable means, for instance, by string, rope or wire and then is immersed in the solvent 3 by means of a hoist 7. After the composite structure has been immersed in the solvent for a predetermined time (which is usually very short, and is only for a time sufficient to render the surface of either the face sheet or the corrugated plastic sheets or both somewhat tacky), the assembly is immediately lifted out of the tank, and the solvent is rapidly removed from the composite structure by any suitable means such as by a blowing device which is not shown in the drawing. Assuming that it is the core material which has the thermoplastic surface (either in its entirety or by virtue of being a plastic coated surface), the solvent treatment causes the core to become soft and tacky, and the adjoining surfaces of the laminate, where the thermoplastic material comes in contact with either another plastic surface or even a non-plastic surface, adhere to each other and become welded together thus forming an integral structure. After the structure is dry, that is after all the solvent is removed so there is no chance of softening of the welded joint, the clamping means are removed.

FIG. 2 shows a tubular corrugated structure 8 formed from flexible corrugated or crimped core sheets 6, and facing sheets 5. A supply of solvent for effecting adhesion of the core sheets and surface sheets is accomplished in this instance by introducing into the spaces between the corrugations, a solvent for the thermoplastic material which is present on the core of surface materials or from which either the core or surface materials are made, supplied from a tank 9 through a pipe 10 to an outlet nozzle 11. The flow of solvent is controlled by a valve 12. The lower end of the tubular structure may be closed off to prevent the escape of solvent. Immediately after the corrugated tubular structure is filled with solvent, it is advantageously tilted to remove the solvent so that the solvent remains in contact with the thermoplastic surfaces for a time which is no longer than is necessary to effect a slight softening and tackification of the surface and thereby causing a joint or welding between the points of contact of the corrugated surfaces and the surface sheets. Any excess solvent which may be present in the assembly is quickly evaporated, for instance, by blowing air through the channels formed in the corrugated sheets. As in the immersion method shown in FIG. 1, the solvent softens the plastic and corrugations at the points where the abutting surfaces merge or come in contact with the facing sheets. The surfaces are thus welded together at the abutting surfaces. Alternatively, where the corrugation spaces are small, it may be advantageous to direct the solvent through these spaces and allow the solvent to drain out rapidly through the bottom to effect the joint or weld by the autogenous bonding caused by the solvating action of the solvent.

FIG. 3 shows various forms which the core material may take, e.g., semicircular, rectangular, in addition to those forms shown in FIGS. 1 and 5.

FIG. 4 is a perspective view of a corrugated core laminate constructed in accordance with my invention wherein the core material 6 is in contact with the surface material 5. This is illustrative of a single laminate in which one lamina or layer of core material is sandwiched between two sheets of surface material, and the points of welding or adhesion 13 result from the solvent treatment to give the unitary welded structure.

FIG. 5 is a view of a honeycomb structure made up of a series of superposed core material 6 sandwiched between two surface sheet materials 5.

FIG. 6 shows another embodiment of a circular arrangement whereby a spiral assembly is used composed of a continuous sheet of core material 6 and a continuous sheet of surface material 5. By introducing a suitable solvent through the corrugation spaces, adhesion and welding of the points of contact can be effected.

FIG. 7 shows the type of weld or joint 13 obtainable between the core material 6 and the sheet material 5.

Included among the solvents which may be employed in the practice of the present invention are those which are solvents for the particular thermoplastic resins employed in the core material and in the surface material. Among those solvents which may advantageously be employed are, for instance, benzene, toluene, hexane, carbon tetrachloride, trichloroethylene, tetrachloroethane, acetone, isobutylketone, ethyl acetate, amyl acetate, monochlorobenzene, fluorobenzene, nitromethane, dimethylformamide, cresol, etc.

In order that those skilled in the art may better understand how the present invention may be practiced, the following example is given by way of illustration and not by way of limitation. All parts are by weight.

*Example 1*

Sheets of ethyl cellulose about 10 mils thick and 1 inch wide were crimped (into a structure as shown in FIG. 4, angular form) by passing them through two meshing gears having about a 15 mil clearance. Additional methods of crimping and making the core material of the present invention may be found in U.S. Patent 2,561,147—Smith, issued July 17, 1951. The distance between successive bends in the crimped sheets was about 1/16″. These crimped sheets were then stacked alternately with uncrimped facing sheets of the same flat ethyl cellulose and were temporarily bound together by a wire so as to maintain the contacting relationship of the crimped sheets with the flat sheets. There were four sections of crimped sheets, each section separated from the other by a flat sheet and the entire assembly containing outer surface sheets of the flat stock ethyl cellulose. Acetone was introduced into the end portion of the total assembly so that all channels of the crimped sheets were subjected to the action of the solvent for a period of about 30 seconds. At the end of this time the solvent was quickly removed by pouring it out of the channels and blowing air through the evacuated channels. The entire assembly was allowed to air dry at room temperature (about 27° C.) for about 30 minutes after which time the wire binder was removed. Examination of the honeycomb structure revealed that the ethyl cellulose wherever it came in contact with an adjacent section of ethyl cellulose, i.e. wherever a portion of the core structure came in contact with any flat stock surface material, at this point a weld had formed merging the two contacting points into a strong rigid structure. This merger by autogenous bonding or welding took place at all points where the corners of the crimped sheet came in contact with the flat sheet stock. The panel thus obtained had extremely good strength, particularly high compressive strength and weights of from 100 to 200 pounds could be placed on this structure without any apparent harmful effect on the honeycomb assembly.

It will, of course, be apparent to those skilled in the art that in addition to ethyl cellulose recited in the preceding example, other thermoplastic materials may be employed or a thermoplastic resin coated composition may be used for the core material or for the surface material or both. In some cases where the thermoplastic material is semicrystalline like polyethylene, a solvent such as toluene is preferably heated before applying the latter for its solvating action to the total assembly. Other semicrystalline polymers can be used, for instance, polyethylene terephthalate, a suitable solvent for this polyester being cresol; nylon, a suitable solvent for this being dimethyl formamide; etc.

As pointed out above, it is not necessary that the entire cellular structure be made from the same material or thermoplastic resin. It is intended within the scope of this invention to use core material whose surface may be of an entirely different thermoplastic nature than of the surface material, and any combination of thermoplastic resins or polymers can be employed as long as one employs a suitable solvent which can cause softening and tackification of the thermoplastic polymer to effect welding or fusing of the latter to the adjacent surface in contact therewith. In addition, alternating sheets of two different thermoplastic materials or alternating sheets of thermoplastic and paper or thermoplastic and metal can be used. Furthermore, one can also employ corrugated sheets of plastic composition capable of being rendered tacky by a suitable solvent in combination with flat sheets which are not subject to solvent action such as paper, metal, etc. The essential feature to insure successful practice of the present invention is that the alternate flat sheets and alternate corrugated sheets in the total assembly be formed of plastic which can be softened and made tacky when subjected to the action of the proper solvent.

What I claim as new and desire to secure by Letters Patent of the United States is:

1. The method of making a honeycomb structure composed of a corrugated core material and a substantially flat surface facing material which comprises (1) forming a stacked assembly composed of the aforesaid core material and surface material in honeycomb contact relationship with each other, at least one of said materials having a resinous thermoplastic solvent-soluble surface thereof in contact with the other material, (2) while maintaining the assembly of the core material and surface material in substantially immovable relationship, immersing the assembly in a volatile liquid solvent for the thermoplastic material for a time sufficient to cause tackiness of the thermoplastic resinous material and to effect autogenous bonding of the points of contact between the core material and the surface material, and (3) removing the assembly from contact with the solvent before undesirable dissolution of the thermoplastic resinous material occurs, the only adhesive binding the points of contact of the core material to the surface material being derived from the solvating action of the above solvent on the thermoplastic material.

2. The method of making a honeycomb structure composed of a corrugated core material and a substantially flat surface facing material which comprises (1) forming a stacked assembly composed of the aforesaid core material and surface material in honeycomb contact relationship with each other, at least one of said materials having a resinous thermoplastic solvent-soluble surface thereof selected from the class consisting of ethyl cellulose, cellulose acetate butyrate and polyvinyl chloride in contact with the other material, (2) while maintaining the assembly of the core material and surface material in substantially immovable relationship, immersing the assembly in a volatile liquid solvent for the thermoplastic material for a time sufficient to cause tackiness of the thermoplastic resinous material and to effect autogenous bonding of the points of contact between the core material and the surface material, and (3) removing the assembly from the contact with the solvent before undesirable dissolution of the thermoplastic resinous material occurs, the only adhesive binding the points of contact of the core material to the surface material being derived from the solvating action of the above solvent on the thermoplastic material.

3. The method as in claim 1 in which the solvent is acetone.

References Cited in the file of this patent

UNITED STATES PATENTS

| 1,510,243 | Perry | Sept. 30, 1924 |
| 1,970,755 | Knoll | Aug. 21, 1934 |
| 2,139,922 | Williams et al. | Dec. 13, 1938 |
| 2,305,658 | Andersen et al. | Dec. 22, 1942 |
| 2,356,023 | Alles | Aug. 15, 1944 |
| 2,413,331 | Munters | Dec. 31, 1946 |
| 2,429,482 | Munters | Oct. 21, 1947 |
| 2,719,566 | Blatt | Oct. 4, 1955 |
| 2,814,581 | Flynn | Nov. 26, 1957 |
| 2,925,624 | Stahl et al. | Feb. 23, 1960 |